(12) United States Patent
Humphrey (10) Patent No.: US 6,792,628 B1
(45) Date of Patent: Sep. 21, 2004

(54) ANIMAL WASTE DISPOSAL DEVICE, SYSTEM, AND METHODS

(76) Inventor: Richard C. Humphrey, 6160 Fair Oaks Dr., Corvallis, OR (US) 97330

( * ) Notice: Subject to any disclaimer, the term of this patent is extended or adjusted under 35 U.S.C. 154(b) by 0 days.

(21) Appl. No.: 10/373,988

(22) Filed: Feb. 25, 2003

(51) Int. Cl.[7] .................................................. A47K 4/00
(52) U.S. Cl. .............................................. 4/661; 4/300
(58) Field of Search ........................... 4/661, 319, 300, 4/367

(56) References Cited

U.S. PATENT DOCUMENTS

| | | | | |
|---|---|---|---|---|
| 3,564,619 A | * | 2/1971 | Magathan ..................... | 4/319 |
| 4,117,555 A | * | 10/1978 | Dennis ........................ | 119/163 |
| 4,228,554 A | * | 10/1980 | Tumminaro ................... | 4/300 |
| 5,234,421 A | | 8/1993 | Lowman ................... | 604/385.1 |
| 5,494,001 A | | 2/1996 | Leibowitz ................... | 119/163 |
| 6,263,834 B1 | | 7/2001 | Igual De Valles ......... | 119/166 |
| 6,273,481 B1 | | 8/2001 | Columbo et al. ........... | 294/1.3 |
| 6,386,605 B1 | | 5/2002 | Kaplan ....................... | 294/1.5 |
| 6,453,844 B1 | | 9/2002 | Janzen et al. ............... | 119/163 |
| 6,471,267 B2 | | 10/2002 | Asazuma .................... | 294/1.5 |
| 6,590,146 B1 | * | 7/2003 | Mrsny ......................... | 4/300 |

FOREIGN PATENT DOCUMENTS

| | | | | |
|---|---|---|---|---|
| DE | 2740867 A1 | * | 3/1979 | |
| GB | 2205119 A | * | 11/1988 | ................... 4/300 |
| WO | WO 79/00458 | * | 7/1979 | |

OTHER PUBLICATIONS

Data on dog waste in Paris and other cities, http://www-.dog-diaper.com.

\* cited by examiner

Primary Examiner—Gregory L. Huson
Assistant Examiner—Khoa D Huynh
(74) Attorney, Agent, or Firm—Lori M. Friedman (57) ABSTRACT

The current invention relates to an environmentally friendly and inexpensive way to dispose of solid animal waste that is installed in conjunction with a household sanitary sewer. The system includes a basin covered with a lid that is installed near a building's sewer cleanout. A wye filling is added to the cleanout so that waste that is deposited into the basin is washed into the household sanitary sewer by pouring a bucket of water in the basin after the waste is deposited to carry it into the household sanitary sewer.

The invention provides a solution to the need for the safe and clean disposal of dog solid waste without the need for any sort of scoopers, diapers or bagging devices.

17 Claims, 5 Drawing Sheets

ANIMAL WASTE DISPOSAL DEVICE, SYSTEM, AND METHODS

BACKGROUND OF THE INVENTION

1. Field of the Invention

The present invention relates to the disposal of the waste of house pets. More specifically, the invention is an environmentally sound solution to the problem of canine waste disposal.

2. Background of the Invention

The problem of properly disposing of dog waste is as universal as is the widespread affection for dogs as pets. In the United States, it is approximated that 38% of households have a dog. This translates into a canine population of 62 million. The popularity of dogs as pets and service animals is world-wide. As found on the website, www.dog-diaper.com, The New York Times (Nov. 1, 1995) reported that canine laws around the world impose fines that try to effectively control an estimated 25 tons of canine waste produced by 250,000 dogs. It also reported that an average of 650 people a year end up hospitalized after slipping on dog waste uncollected on Paris sidewalks.

A measure of the pet waste disposal problem in urban centers is also reflected in many current U.S. canine laws, sometimes called "pooper scooper" laws, both in the U.S. and abroad. These statutes impose considerable fines upon dog owners who do not pick up after their dogs.

Various methods have been advocated for the disposal of animal waste from canine house pets. Present methods of controlling dog waste have been described in, for example, in U.S. Pat. No. 6,273,481 to Columbo et al. This art involves a kit whose components enable the dog's human walker to pick up the solid waste and dispose of it in a bag. Many dog walkers follow a similar routine using miscellaneous bags as the pickup and disposal means. Users of this and similar practices are often inconvenienced and embarrassed to pick up the waste by hand, using papers, plastic bags or cumbersome pooper scoopers in order to comply with the law.

Other art, including U.S. Pat. No. 6,471,267 to Asazuma involves ensnaring and collecting dog waste describes waste capture that minimizes a person's exposure to the waste. The waste still needs to be deposited somewhere for disposal. There are numerous patents and devices marketed as dog diapers, one of which is U.S. Pat. No. 5,234,421 to Lowman. This particular patent addresses the special needs of incontinent dogs but there are other patented and non-patented dog diapers that eliminate the need for human pick-up of the waste. The diapers are strategically placed on the dog and offer the cleanest way to deal with dog waste both outdoors and indoors, by preventing dog waste from ever being deposited on any floor or outdoor surface. A dog diaper product frees dog owners from having to pick-up waste but the full diaper still needs disposal. Putting a diaper on the dog before use and removing it after use to dispose of it in a garbage can avoids direct contact with the waste, as occurs when the waste is picked up by hand.

Several inventors, including Igual De Valles in U.S. Pat. No. 6,263,834, Janzen et al in U.S. Pat. No. 6,453,844, and Leibowitz in U.S. Pat. No. 5,494,001 have developed dog toilet-type devices which use water in some form to wash the waste away. Further toilet-like dog waste disposal is seen in U.S. Pat. No. 6,386,605 wherein Kaplan uses a strategically placed paper towel to collect dog waste which is then flushed down a household toilet. Practical success of the methods and devices are unknown.

What is known, however, is that disposal of dog waste is a growing environmental problem. Animal waste poses health hazards in city streets, parks and other public places when uncollected. Furthermore, retrieval of waste in a variety of bags for disposal in garbage cans and/or dumpsters is quite an environmental burden. Adding to the environmental insult is the fact that the unwrapped animal waste itself is very recyclable. When wrapped in a plastic bag and thrown in household trash that is usually sent to land fills, the potentially recyclable waste becomes an environmental burden.

Accordingly, it is an object of the present invention to provide a system that allows for an environmentally friendly disposal of solid pet waste into a household or municipal sewer. The animal waste may be scooped with a shovel or similar device negating the necessity and expense for dog diapers, disposal bags, and the like. The waste is then washed into the household or municipal sewer by pouring a quantity of water into a receiver and subsequently, into the sewer.

A further object of this invention is to provide a covered cylindrical plastic receiver which is easily installed in a home by connecting to the home's sewer cleanout or directly into the sewer line. In this manner, when the dog waste is found in a fenced backyard, a home owner/dog owner can easily use a shovel to deposit the waste in the receiver and a household bucket to pour water in the receiver to "flush" the waste into the sewer. Besides being environmentally friendly, there is no need for special tools or scoopers.

A still further object of this invention is to provide a version of the system for use in public parks and the like. This would be larger and constructed of stainless steel or other metal, and comply with the statutes of the municipality in which it is located.

Further objects will be made clear in the figures and detailed description of the invention which follows.

SUMMARY OF THE INVENTION

The present invention is directed to a device for the disposal of solid animal waste into a receiver which connects, through a water trap and PVC line, to a sewer. After the waste is deposited into the receiver, it is sent into the sewer by the force a quantity of water which is poured into a receiver by a person using an ordinary household bucket.

DEFINITIONS

In this invention, a 'household sanitary sewer' is defined as a system that carries waste materials from throughout a home or other building leading to a municipal sewer or a septic system.

In this invention, the term 'septic system' will refer to a tank for receiving waste matter to be putrefied and decomposed through bacterial action and a leach field.

In this invention the term 'municipal sewer' will indicate a sewer system operated by a local government or municipality. The municipal sewer system will refer to a sewer that has the ability to handle and process waste from a number of homes, businesses or other buildings.

In this invention, a 'one-way sewer cleanout' defines an opening in a drainage line that provides one-way access to the inside of a household sanitary sewer. A one way sewer cleanout is generally installed to provide access to remove and unblock obstructions in the household sanitary sewer line towards the municipal sewer or septic system.

In this invention, a 'two-way sewer cleanout' defines an opening in a drainage line that provides two-way access to the inside of the household sanitary sewer, allowing clearing of obstructions in the sewer line which may be located either in a direction towards the municipal sewer/septic system or towards the house.

DETAILED DESCRIPTION OF THE PREFERRED EMBODIMENTS

Figure 1:
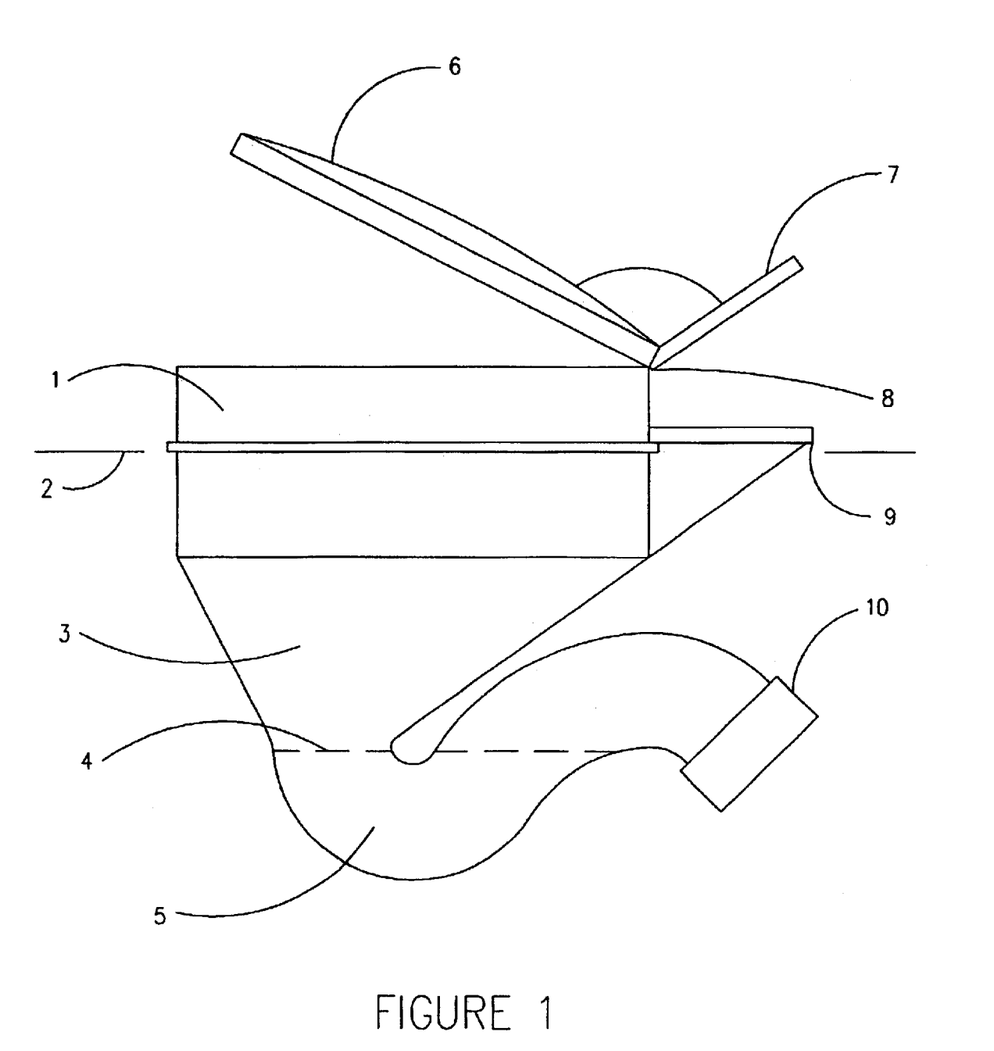
FIG. 1 depicts a detailed side view of the animal waste disposal device of the invention.
Figure 2:
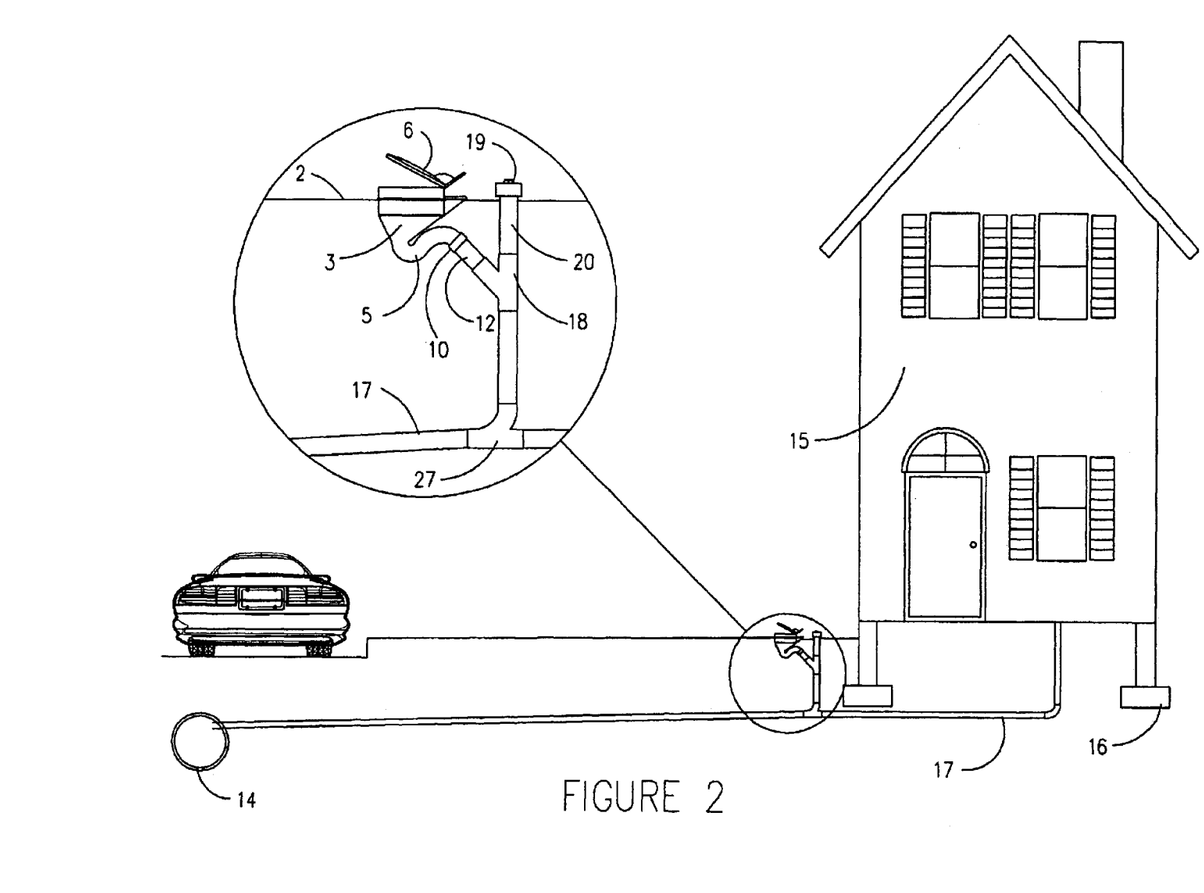
FIG. 2 shows an overview of the location and placement of a typical household installation of the animal waste disposal device of the invention.

With reference to the figures, FIG. 1 shows the animal waste disposal device of this invention. FIG. 2 shows the device installed on the outside of a residential home or other building. The device includes a cylindrical receiver 1, which is adjacent to the household sanitary sewer 17 of a building, such as a home 15. It is largely underground, as indicated by the ground level indicator 2.

Connected to and below the receiver 1 is a molded basin 3 with a water trap 5 leading to a PVC line to the household sanitary sewer 17. FIG. 2 shows a typical installation of the animal waste disposal device of this invention on the premises of a private residential home 15. The position of the home's foundation 16 in relation to the household sanitary sewer 17 and municipal sewer 14 are shown.

Figure 3:
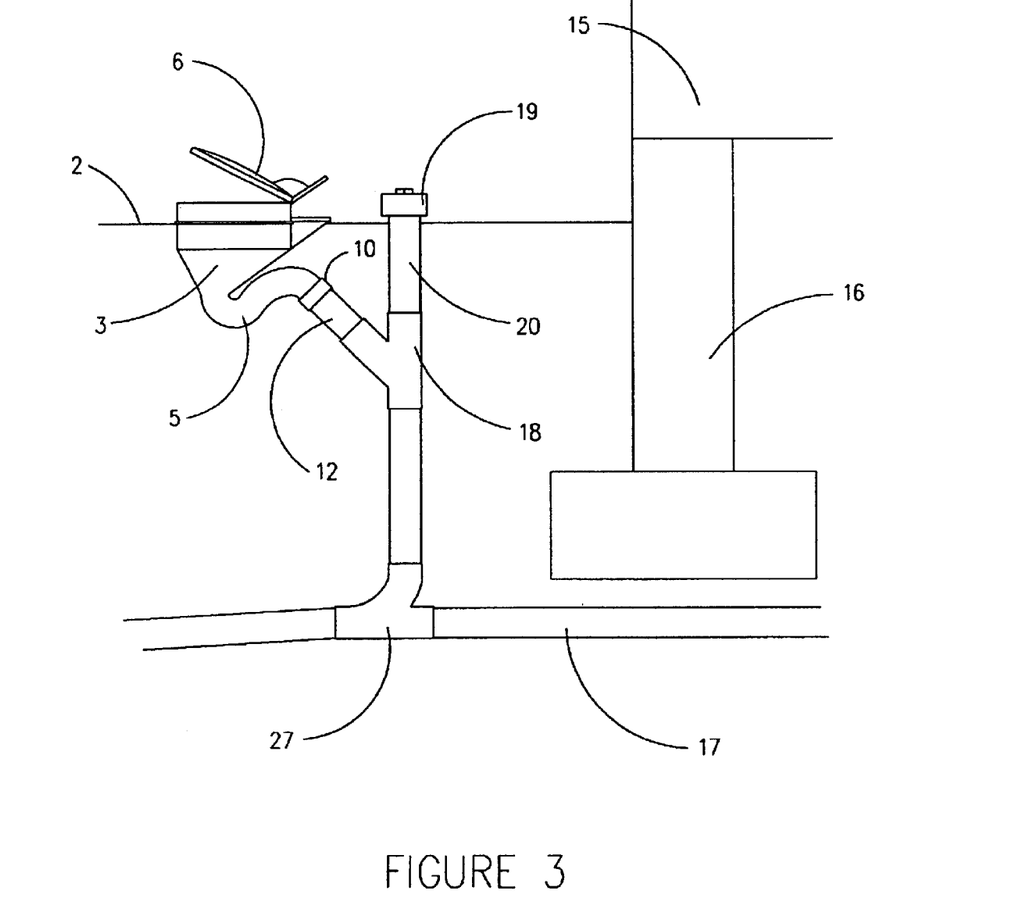
FIG. 3 shows an exploded view of the animal waste disposal device of the invention in a typical vertical installation.

FIG. 3 depicts an enlarged, more detailed view of the animal waste disposal device of this invention installed in a vertical fashion. Illustrated therein are the receiver 1, the basin 3, the water trap 5 which leads to the PVC pipe 12. The wye fitting 18 is shown installed vertically between the one way sewer cleanout fitting 27 and the sewer cleanout cap 19.

Figure 5:
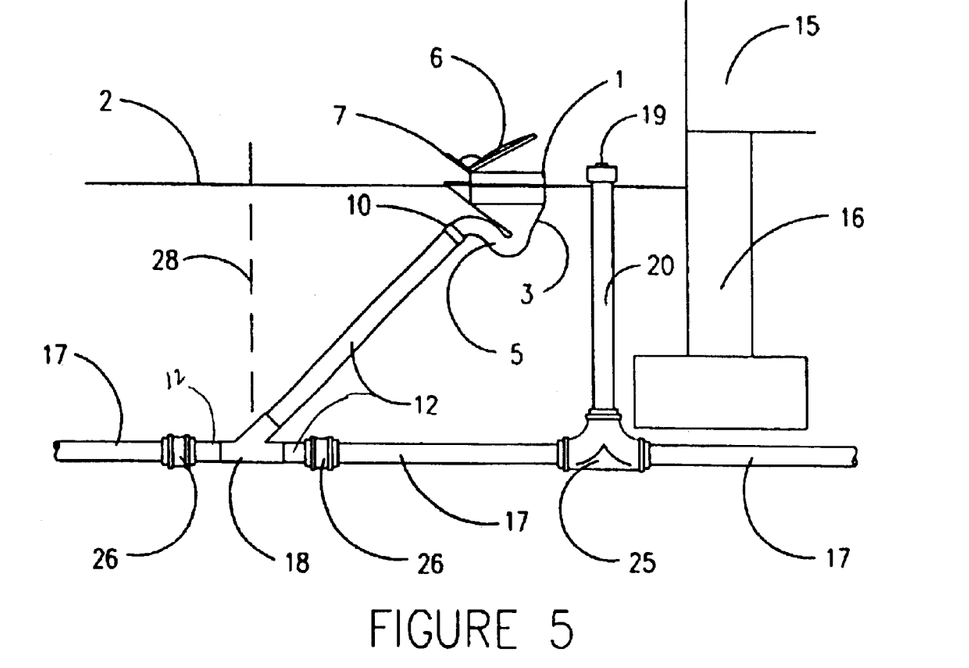
FIG. 5 depicts a typical horizontal installation of the device of this invention in conjunction with a two-way sewer cleanout.

The majority of residential homes in the United States have one-way sewer cleanout fittings 27, as described above. In the case of homes that have two-way sewer cleanouts 25, as seen in FIG. 5, each end of the two-way cleanout 25 points to both the home 15 and the municipal sewer 14. The overview of FIG. 2, showing an embodiment of the installed device of this invention, a home 15, the household sanitary sewer 17, and the municipal sewer 14 depicts a typical layout of these entities.

If a home 15 has a two-way sewer cleanout 25, installation of the animal waste disposal device of this invention is installed with the wye fitting 18 installed horizontally. In this manner, the installer exposes a small section of the household sanitary sewer line 17 and installs a PVC wye 18 in its place.

To install the animal waste disposal device of this invention in a home with a one-way sewer cleanout fitting 27 installation of the device will be vertically. The procedure for its installation, either horizontally or vertically, is relatively easy and without the need for special tools or the services of a contractor. The tools needed for the vertical installation include items such as a shovel 23 and tools such as a hand saw, tape measure, level, glue used with PVC, paper towels, a knife and/or sandpaper, and a flashlight (not shown). For buildings with a two-way sewer cleanout, a horizontal installation is required. For a horizontal installation, additional supplies include two 3" no-hub rubber plumbing (Femco) couplings 26, a screw driver and/or nut driver, and gloves (not shown).

First Preferred Embodiment

Vertical Installation to a One-way Sewer Cleanout

To begin a vertical installation of the device of this invention, FIG. 3 shows the sewer cleanout cap 19 of the sewer cleanout pipe 20 which is removed and set aside. The installer must look into the cleanout pipe 20 with a flashlight (not shown) to determine if the cleanout fitting at the bottom of the cleanout pipe 20 is a one-way 27 fitting (vertical installation needed) or two-way 25 fitting (horizontal installation needed).

The installer must determine where s/he wants to position the basin 3 of the animal waste disposal device. This will be important once the animal waste disposal device and system is installed since the basin 3 will be used for depositing animal waste 22 for disposal. It is also an important safeguard before installation is begun to make sure that no underground utilities are located in the installation area.

With the shovel 23 or other excavating device, a hole with surface dimensions of about 16×28 inches and about 20 inches deep is made adjacent to the sewer clean out pipe 20. After excavating the hole, all loose dirt and debris from the hole must be removed. The top of the sewer cleanout pipe 20 must now be cut and removed in order to add the wye fitting 18 to it.

The top of the sewer cleanout access pipe 20 is cut with a hand saw about 20 inches below ground level 2. Next, any burs are removed from the cut with a knife or sand paper (not shown). Any dirt on the outside of the top of the sewer cleanout pipe 20 is removed with paper toweling. When the top of the sewer cleanout pipe 20 is clean, the PVC wye fitting 18 is glued in place. Glue is applied to the outside of the sewer cleanout pipe 20 and to the bottom of the wye fitting 18. The wye fitting 18 is then pushed and twisted onto the sewer cleanout pipe 20, insuring its alignment with the center of the hole. It is held in place for about 20 seconds while the PVC glue dries and cures.

Next, about 6½ inches of the bottom of the sewer cleanout pipe 20 is cut off with a saw (not shown), and burrs are removed. The sewer cleanout pipe 20 and cleanout cap 19 is now reinstalled in top of the wye fitting 18.

In order to complete installation of the animal waste device of this invention, about 7½ inches of three inch PVC pipe 12 is cut and burrs removed. The piece is then glued into the wye fitting 18. (All gluing described should be according to package instructions of the PVC glue used, regarding ventilation and manner of attachment.)

At this point, a small wad of paper toweling (not shown) is put in the end of the 7½ inch piece of PVC pipe 12. Being careful not to get dirt in the PVC pipe 12, about nine inches of dirt should be shoveled back into the original hole dug around the sewer cleanout pipe 20. It is critical not to overfill, so that the receiver 1 will fit in place properly with respect to the other components of the animal waste disposal device of this invention.

At this point, the wad of paper toweling is removed and glue applied to the outside of the length of 3 inch PVC pipe 12 and to the inside of the 3 inch PVC connection 10 and fitted together. Before glue cures, the installer levels the receiver 1. This will insure that the completed animal waste disposal device will function properly. The rest of the soil originally excavated is now replaced around the receiver 1 and cleanout pipe 20. A small amount of crushed rock, bark dust or other decorative material (not shown) may be placed around the unit for both decoration and to keep mud and dirt from interfering with the operation of the animal waste disposal system of this invention.

Second Preferred Embodiment

Horizontal Installation Involving a Two-way Sewer Cleanout

Figure 5A:
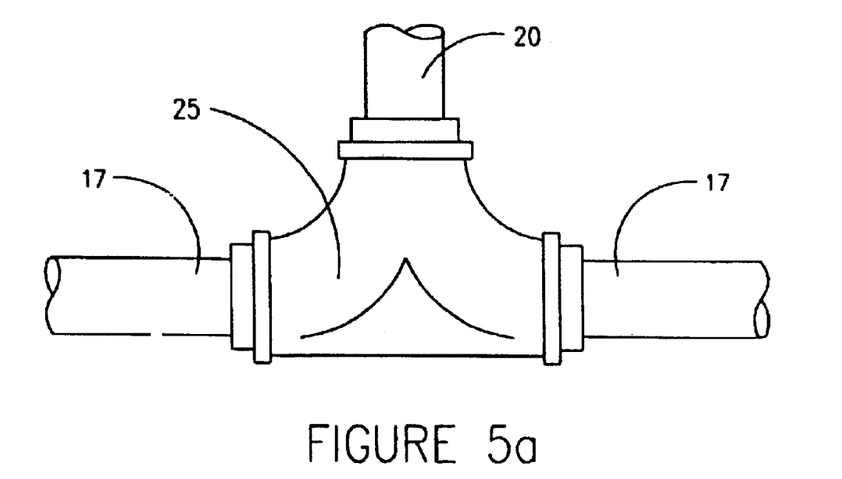
FIG. 5a depicts a two-way sewer cleanout.

To install the animal waste disposal device of this invention in a home or building with a two-way sewer cleanout 25, as seen in FIGS. 5 and 5a, the depth of the sewer line 17 from the ground level line 2 must be measured. To this value, twelve inches must be added to determine the horizontal distance from the sewer cleanout pipe 20 that must be excavated and exposed. Twelve inches is added to this measurement due to the geometry of the wye fitting 18 and the relative position of the PVC connector 10 to the ground level indicator 2 on the receiver 1. For example, if the sewer line 17 is measured vertically and is found to be 18 inches from where the ground level indicator 2 would need to be for proper installation of the device, then twelve inches is added to the eighteen inch dimension, making a total of 30 inches.

In this example, thirty inches is the horizontal dimension from the cleanout pipe 20 to the point to be excavated 28. Excavation point 28 is the center of the length of sewer pipe 17 that will be removed. (The earlier cautionary statement about underground utilities should be heeded here as well.).

After determining the area to be excavated from this measurement and calculation, a sixteen to twenty-inch section of the sewer line 17 is then exposed by digging with a shovel 23 or other excavating means. Excavation to a level that is an inch or two below the sewer line 17 is required to gain access so that the installer can easily cut sewer line 17.

After the digging to expose the sewer line 17 is complete, the installer digs toward the home 15 to make room for the installation of the component parts of the animal waste disposal device of the present invention, including the cylindrical receiver 1, the molded basin 3, the lid 6, the lid activator 7, the hinge pin 8, and the lid stop 9 as seen in FIG. 5. Then, two three-inch lengths of PVC pipe 12 are cut. The pieces of PVC pipe 12 are glued to each end of the straight part of the wye fitting 18. This is done by applying glue to the inside of the wye fitting 18 and to one end of the two three-inch lengths of PVC pipe 12. The PVC pipe 12 is twisted and inserted into the wye fitting 18 and held firmly for about 20 seconds. The gluing is repeated for the other length of PVC pipe for attachment to the other end of the wye fitting 18.

The installer then measures and confirms that the distance between the ends of each three-inch length of PVC pipe 12 is about 10 inches. The installer then refers to the earlier calculation of excavation point 28 and marks this point on the sewer line 17. The installer then cuts a length of sewer line 17, that is equal to plus ¼ inch of the length of the wye fitting 18 and the two three-inch pieces of PVC pipe 12. It is important that this section of sewer pipe 17 that is cut out is centered on the calculated excavation point 28.

The outside ends of the cut sewer pipe 17 should be wiped clean with a paper towel (not shown). Next, two no-hub three-inch (Fernco) couplings 26 are loosened and slid onto each exposed end of the sewer pipe 17.

The wye fitting 18 is then inserted between the two ends of the sewer pipe 17 with the wye pointed upwards and towards the home 15. The two no-hub three-inch (Fernco) couplings 26 are now slid onto the pieces of PVC pipe 12 that have been previously glued into the wye fitting 18. After this is done, the two no-hub three-inch (Fernco) couplings 26 are tightened.

Another length of PVC pipe 12 is now cut to extend from the wye fitting 18 to the 3D PVC connection 10. When the fit is confirmed, one end of the PVC pipe 12 is glued to the 3" PVC connection 10. The other end of the PVC pipe 12 is glued to the 3" PVC wye fitting 18.

When this is complete, the area around the installed animal waste disposal device, the excavated earth is replaced around the outer structure of the device. Care must be taken that the receiver 1 stays level and that no pipes or fittings are strained. As in the vertical installation described, a small amount of crushed rock and/or bark may be employed here for decoration.

Figure 4:
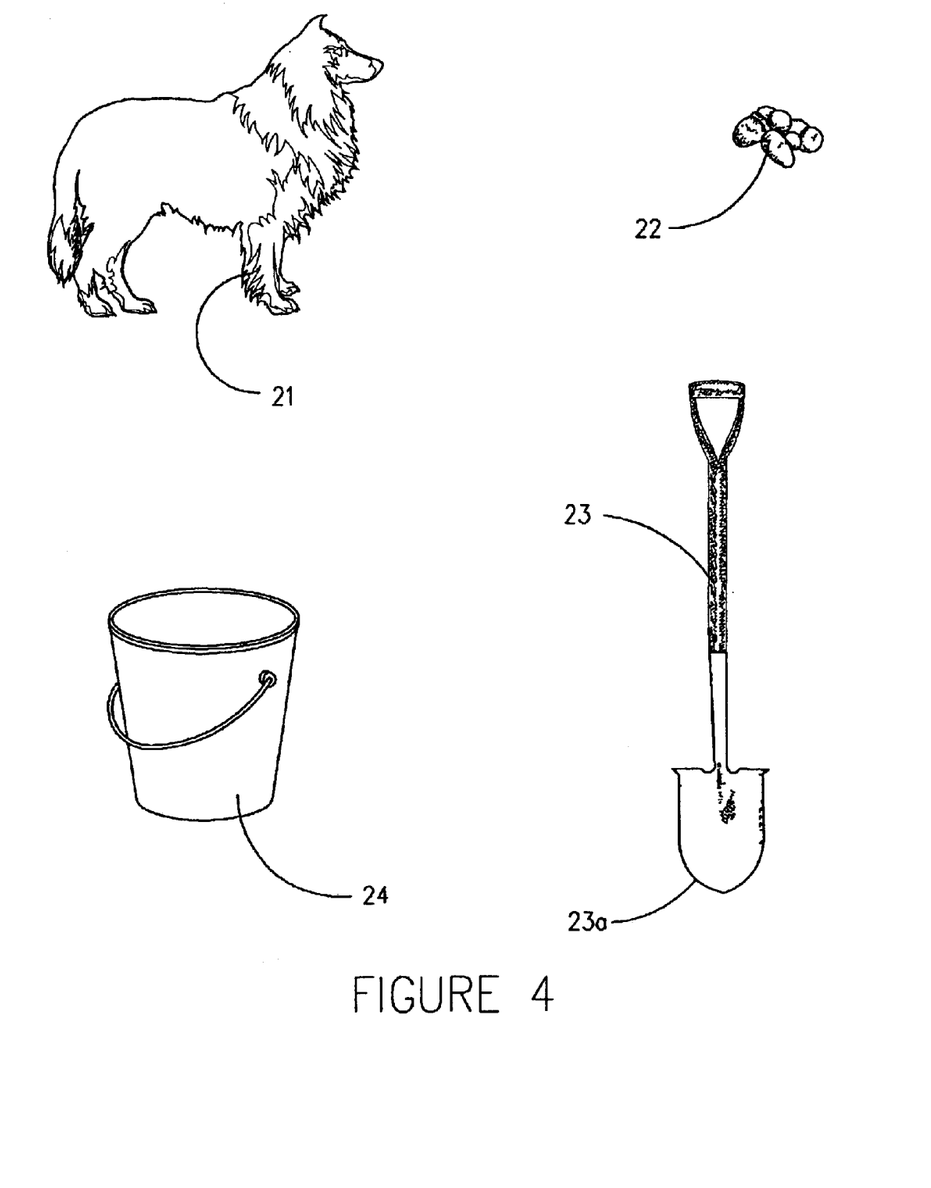
FIG. 4 shows a dog, an amount of solid waste from the dog, a shovel and a bucket used to dispose of animal waste in the device, system and process of this invention.

Illustration of the Process of Using of the Animal Waste Disposal System of the Present Invention To use the animal waste disposal system of the invention, a dog 21 will excrete waste 22. The dog's owner will be able to use the blade 23a of a shovel 23 to lift the waste 22 and walk it over to the animal waste disposal system. The owner (not shown) will depress a lid activator 7 with his foot which will lift the lid 6 of the disposal device.

Once the lid 6 is open, the owner can deposit the waste 22 and deposit it into the device's basin 3. Once this is done, the owner can fill a bucket 24 with a quantity of water from any outside spigot (not shown) that is close to the device and deposit from about one to three gallons of water into the basin 3. The dog's owner has now cleanly, safely, and inexpensively disposed of the waste 22 without the need for dog diapers, pooper scoopers or any other accessories. The waste 22 is now processed along with that of the rest of the household sewage.

If the animal waste disposal system of this invention is installed and used in a public area, the procedure will be the similar, but on a larger scale. The municipality that supervises the public area (park, public dog walk area, and the like) will be able to set rules and regulations as they see fit These rules can include procedures designed to collect and flush the waste and any limits on quantities and sizes of pets accommodated. The ability of the municipality to process sewage will determine (and perhaps limit) the amount of public usage of he system.

Scope of the Invention

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention.

What is claimed is:

1. A method of utilizing a waste receiving apparatus for disposing of solid animal waste from a household pet into a household sanitary sewer, said method comprising the steps of:
   a) providing an outdoor enclosure on a ground level, said enclosure having a cylindrical receiver, a molded basin, a lid hinged to said cylindrical receiver, a lid activator attached to an aft portion of said lid and a lid stop connected to said cylindrical receiver and adjacent said lid activator, said enclosure connected to said household sanitary sewer capable of receiving the waste;
   b) depressing said lid activator with a user's foot to open said lid when there is animal waste to be deposited;
   c) depositing said waste into said molded basin which is situated below the lid and the cylindrical receiver;
   d) pouring manually a quantity of water from a bucket into said molded basin to completely dispose of the waste that has been deposited therein; and
   e) closing said lid by removing the foot from said lid activator, wherein only said cylindrical receiver, said lid, said lid activator and said lid stop are located above said ground level and other remaining parts of the waste receiving apparatus are located below said ground level, wherein said other remaining parts of the waste receiving apparatus that are below ground level including a water trap, a water trap line, a PVC pipe, PVC connectors, a wye fitting, a sewer cleanout pipe, and sewer cleanout couplings.

2. The method of claim 1 whereby the water that is poured into said molded basin carries the solid animal waste into the household sewer system along with other waste from the household and is connected to the home's plumbing system solely by means of the sewer cleanout and is not connected to the home's water supply.

3. The method of claim 2 wherein the water poured into said molded basin is filled and poured manually by a person, said waste then washing into the household sewer system and subsequently into the municipal sewer system.

4. The method of claim 1 wherein the animal waste is disposed of without the need of disposable pick-up and containment means and is collected from the ground and deposited into said molded basin using a shovel where it is deposited without further break-up and without a forceful stream of water to break up the waste.

5. The method of claim 1 wherein said cylindrical receiver ranges in size from about six to about twenty-four inches in diameter.

6. The method of claim 1 wherein the amount of poured water ranges from about one to three gallons and is poured by a Person using said bucket without a forceful stream of water to break up the waste.

7. The method of claim 1 wherein the deposited waste is carned to said household sanitary sewer by said PVC pipe having a three-inch diameter and connecting to said wye fitting that leads to said sewer.

8. The method of claim 1 wherein the size of said cylindrical receiver and its materials of construction are in proportion to the amount of animal waste that is regularly deposited therein and disposed of in the outdoor enclosure which is connected to the sewer systems of residential homes, kennels, public parks, and apartment complexes.

9. The method of claim 1 wherein the outdoor enclosure is connected to said household sanitary sewer cleanout of the type selected from the group consisting of a one-way sewer cleanout and a two-way sewer cleanout.

10. A method for installing a waste receiving apparatus allowing disposal of animal solid waste into a household sanitary sewer with a one way sewer cleanout, said waste receiving apparatus having an outdoor enclosure on a ground level, said enclosure having a cylindrical receiver, a molded basin, a lid hinged to said cylindrical receiver, a lid activator attached to an aft portion of said lid and a lid stop connected to said cylindrical receiver and adjacent said lid activator, said enclosure connected to a household sanitary sewer capable of receiving the waste, said method including the steps of:
   a) ensuring that the cleanout is a one-way cleanout by removing the cap and looking into the cleanout fitting at the bottom of the cleanout pipe;
   b) ensuring that no underground utilities are located in the desired installation area,
   c) excavating a hole about 16 by 28 inches and about 20 inches deep adjacent to the sewer cleanout pipe;
   d) cutting and removing the top of the sewer cleanout pipe so that a wye fitting can be added to it;
   e) gluing the wye fitting to the top of the sewer cleanout pipe ensuring its alignment with the center of the excavated hole;
   f) cutting about 6½ inches from the bottom of the top section of the sewer cleanout pipe that was previously cut off;
   g) re-installing the top section of the sewer cleanout pipe into the lop of the wye fitting by gluing;
   h) cutting about 7½ inches of a three-inch diameter PVC pipe and gluing it into the side inlet of the wye fitting;
   i) waiting for the glue to dry;
   j) shoveling about 9 inches of dirt into the hole that was originally excavated, taking care not to allow dirt to get into the cleanout pipe and re-installing said pipe on the top of the wye filling;
   k) applying glue to the an upper end of the 7½ inch long three inch wide PVC pipe that is connected to the wye fitting;
   l) attaching and leveling a covered cylindrical receiver basin to the 7½ inch long three inch wide PVC pipe through a water trap;
   m) filling the dirt that was previously excavated around the cylindrical receiver around said receiver, being careful not to move said receiver;
   n) completing the installation by adding an amount of rock, bark dust or other decorative material by placing it around the receiver for both decoration and to keep mud and dirt from interfering with the operation of the animal waste disposal system.

11. The method of claim 10 wherein the animal waste is deposited in said molded basin by a person using a shovel; said waste is then carded into the household sanitary sewer by from about one to three gallons of water poured into the cylindrical receiver from a bucket by the person without a forceful stream of water to break up the waste.

12. The method of claim 10 wherein the wye fitting is installed vertically in place of a section of the cleanout pipe of said sewer that utilizes said one-way sewer cleanout.

13. The method of claim 10 wherein the completed installation is an attractive and functional device that is part of a finished, landscaped home.

14. A waste collecting apparatus that allows the disposal of solid animal waste from a household pet into a household sanitary sewer, said waste collecting apparatus comprising, an outdoor enclosure located on a ground level, said enclosure having a cylindrical receiver with an open top, a molded basin, a lid hinged to said cylindrical receiver, a lid activator attached to an aft portion of said lid and a lid stop connected to said cylindrical receiver and adjacent said lid activator, said enclosure connected to said household sanitary sewer, said lid is activated to open and close manually by depressing said lid activator with a user's foot, said molded basin disposed below said cylindrical receiver, said basin having a water trap which leads to a PVC pipe;

a wye fitting located downstream from the water trap and disposed between said PVC pipe and said household sanitary sewer, said wye fitting allows the deposited solid animal waste to flow when a quantity of water is manually poured from a bucket into said molded basin and into and through said household sanitary sewer, said waste collecting apparatus is installed largely below-ground and is not connected to the household water supply, wherein only said cylindrical receiver, said lid, said lid activator and said lid stop are located above said ground level and other remaining parts of the waste receiving apparatus are located below said ground level, wherein said other remaining parts of the waste receiving apparatus that are below ground level including said water trap, a water trap line, a PVC pipe, PVC connectors, said wye fittings, a sewer cleanout pipe, and sewer cleanout couplings.

15. The device of claim 14 wherein the quantity of poured water ranges from about one to three gallons and is poured manually by a person using said bucket utilizing water that is not pressurized and which causes no further break-up of the waste before disposal.

16. The device of claim 14 wherein the construction materials of the component parts and fittings used to construct said waste receiving apparatus for household pet solid waste disposal in said sewer comply with the uniform plumbing codes of the municipality of the location where it is installed.

17. The device of claim 14 wherein the size of the component parts and fittings used in construction are large enough to handle the quantity of animal waste deposited when the device is installed in a public access area.

* * * * *